Patented May 26, 1931

1,806,588

UNITED STATES PATENT OFFICE

HERMANN ESPIG AND WOLFGANG TEUBNER, OF BITTERFELD, GERMANY, ASSIGNORS TO I. G. FARBENINDUSTRIE AKTIENGESELLSCHAFT, OF FRANKFORT-ON-THE-MAIN, GERMANY

SURFACE TREATMENT OF SYNTHETIC PRECIOUS STONES

No Drawing. Application filed February 7, 1930, Serial No. 426,765, and in Germany February 11, 1929.

The present invention relates to a surface treatment of synthetic precious stones, particularly of such belonging to the class of corunds and spinels and consisting either entirely of pure alumina or of alumina containing a small percentage of magnesia. An object of the present invention is to provide a simple method of producing a perfectly smooth surface of these stones, such as was hitherto only obtainable by grinding and polishing.

According to the present invention a perfectly smooth surface is obtained by treating the stones for a few minutes with fused anhydrous sodium tetraborate ($Na_2B_4O_7$). Preferably the moderately preheated stones are dipped into a melt of sodium tetraborate having a temperature of about 750° to 800° C. and moved about therein for a period of, say, 5 minutes. The stones are then taken out of the melt and allowed to cool, whereupon any sodium tetraborate still adhering to the surface of the stones is removed by rinsing them in water. After this treatment the surface of the stones has become perfectly smooth and transparent.

The process according to the present invention is equally applicable to cut stones such as are employed as bearings in watches and electrical appliances, and to raw stones or shapes made of these stones.

We claim:

1. The process which comprises treating the surface of synthetic precious stones, belonging to the class of corunds and spinels and being mainly composed of alumina, with fused anhydrous sodium tetraborate.

2. The process of treating the surface of synthetic precious stones, belonging to the class of corunds and spinels and being mainly composed of alumina, which process comprises dipping the moderately preheated stones into a melt of sodium tetraborate having a temperature of about 750° to 800° C., agitating the stones therein for a period of about 5 minutes, removing them from the melt and allowing them to cool.

In testimony whereof, we affix our signatures.

HERMANN ESPIG.
WOLFGANG TEUBNER.